Patented Feb. 8, 1949

2,461,163

UNITED STATES PATENT OFFICE 2,461,163

PRODUCTION OF INVERT SUGAR

William A. La Lande, Jr., Upper Darby, Pa., assignor to Attapulgus Clay Company, Philadelphia, Pa., a corporation of Delaware No Drawing. Application March 13, 1946, Serial No. 654,227

9 Claims. (Cl. 127—41)

The present invention relates to the hydrolysis of polysaccharides to monosaccharides, and relates more particularly to the production of invert sugar from sucrose solutions using bentonite as the agent for promoting inversion.

It has been proposed heretofore to remove from raw sugar solutions, various "non-sugar" substances including fiber, nitrogenous bodies, fats and waxes, pectin and gums, and other impurities by treatment of the raw sugar solutions with very small amounts of bentonite, i. e., of the order 0.1% to 2%, at temperatures between 180° F. and 210° F. By the use of these small amounts of bentonite, the "non-sugar" substances are coagulated and precipitated together with the bentonite, and may be readily removed from the clarified sugar solutions by filtration or other means. Under the conditions obtaining in this clarification treatment, little or no inversion of the sucrose solutions results, and in fact, inversion is most undesirable in the refining of sugar solutions for the production of high yields of pure sucrose.

However, in accordance with the present invention, I have found that bentonite, under certain conditions, is a remarkably effective agent for promoting inversion of polysaccharide solutions, and particularly sucrose, with a substantial conversion to invert sugar. Also, under the same conditions, some decolorization and removal of ash-forming constituents is accomplished, with the resultant production of high purity invert sugar solutions or syrups.

In the application of the method of the present invention, several techniques are available. For example, when it is desired to carry out the inversion by percolation, the raw bentonite is granulated by drying, grinding and screening to desired mesh size, for example, 10–30 mesh, 30–60 mesh, 20–80 mesh, or the like, and the granular material is calcined at a temperature above 500° F., and preferably between 700° F. and 1200° F. to harden the material against breakdown when brought into contact with aqueous sugar solutions. Alternatively, the raw bentonite may be extruded in a plastic state at elevated pressure through a die plate provided with a plurality of small apertures, and the extruded rods or shapes then dryed, ground, screened, and calcined as above described. The granular bentonite is then charged to a suitable vessel to form an elongated bed, and the sugar solution to be treated is charged to the top of the bed and is permitted to percolate or flow downwardly through the bed in intimate contact with the bentonite granules.

The bentonite appears to reduce the pH of the sugar solution, and elevated temperatures promote inversion. Therefore it is advantageous to adjust the amount of bentonite used, the temperature, and the time of contact so that maximum inversion is accomplished within a reasonable period of time. I have found that in order to obtain substantial yields of invert sugar, the percolation temperature should be maintained between 150° F. and 200° F., and preferably between 160° F. and 170° F., although higher temperatures may be used provided precautions are taken to prevent substantial loss of water by vaporization. In no event, however, should the temperature be sufficiently high to cause carmelization. The quantity of bentonite used should be not less than 5% by weight of the sugar solution to be treated, or using conventional refinery terminology, the yield of invert sugar solution should be controlled to give not more than 15 pounds of sugar solids per pound of bentonite. Preferably, the ratio of sugar solids to bentonite should range between 2 and 10 to 1. When the ratio of sugar solids to bentonite is appreciably greater than 15, inversion is greatly reduced and the yield of invert sugar reaches a commercially uninteresting level. The time of contact of the sugar solution with the granular bentonite during percolation may vary within limits, and a space velocity up to about 1.5 volumes of sugar solution per volume of bentonite granules per minute is satisfactory. In general, the lower the space velocity, the higher the percentage conversion into invert sugar. During treatment of the sugar solutions with bentonite to obtain inversion, the pH of the solutions may fall within the range of 2 to 5. The promoting activity of the bentonite will gradually decrease with use, and is evidenced by an increase in pH of the treated solution and a decrease in the content of invert sugar in the solution. The activity of the bentonite may be restored by water washing or steaming, followed by recalcination at temperatures preferably between 700° F. and 1200° F.

In another modification of the present invention, the inversion of sugar solutions may be obtained by intimately contacting the solution with finely divided particles of either raw or calcined bentonite. For example, the sugar solution, preferably at a temperature between 150° F. and 200° F., is thoroughly agitated with bentonite having a mesh size smaller than 80, the amount of bentonite being at least 5% by weight based upon the sugar solution. When the quantity of bentonite exceeds 25% to 30% by weight, the agitation or stirring becomes extremely difficult, and it is therefore preferable to use not more than about 30% of bentonite. After a suitable contacting period, which may vary from a few minutes to an hour or more depending upon the concentration of bentonite in the solution, the bentonite may be removed from the treated solution by settling, filtering, or centrifuging. The resulting solution containing a substantial quantity of invert sugar may be used as such, or may be subjected to a further refining treatment such as decolorization with char or bauxite.

In order to obtain maximum inversion efficiency, it is preferable to use sugar solutions which have been subjected to a preliminary clarification by conventional methods, so that the bentonite will not become unduly fouled with "non-sugar" materials, particularly fiber, fats and waxes, pectin and gums, as well as ash-forming substances not readily removable by water washing or calcination. By employing sugar solutions which have already been defecated or clarified, the bentonite may be used to full advantage for purposes of inversion, with some incidental decolorization or ash removal, and the resulting solution containing invert sugar may be consumed directly, or further purified if desired. Since the inversion is never 100% effective, the final product will contain varying amounts of sucrose. By carefully regulating the treatment, or by recirculating the initial throughput for further treatment with additional quantities of bentonite, there may be obtained solutions containing very high percentage of invert sugar.

My invention may be further illustrated by the following examples, which, however, are not to be construed as limiting the scope thereof.

1. Bentonite of 10–30 mesh was prepared by drying, grinding and screening raw bentonite, and thereafter calcining the granular material at 900° F. for ½ hour to obtain a volatile matter content, mostly water, of 4.3% by weight. The volume weight of the granular bentonite was 55 pounds per cubic foot. The granular bentonite was charged to percolation tower and the temperature of the bentonite was maintained at 165° F. by passing steam through the tower jacket. A washed sugar liquor of about 60° Brix was then percolated, at 165° F., through the bentonite at a rate of 1.25 volumes of sugar liquor per volume of bentonite per minute. The filtrate was taken at yields of 2 and 10 pounds of sugar solids per pound of bentonite, respectively. The properties of the washed liquor charged and the resulting solutions containing invert sugar are given in the following table.

| Properties | Washed liquor charged | Filtrate | |
| --- | --- | --- | --- |
| | | 2 lbs. per lb. | 10 lbs. per lb. |
| Apparent purity | 98.209 | 68.212 | 83.280 |
| Invert 100° V | 0.721 | 38.402 | 16.994 |
| Ash 100° V | 0.543 | 0.176 | 0.229 |
| Color 1" cell | 31.4 | 8.2 | 13.0 |
| pH | 6.25 | 2.7 | 3.4 |
| Dry basis: | | | |
| Polarization | 97.382 | 67.802 | 82.951 |
| Invert | 0.702 | 26.053 | 14.097 |
| Ash | 0.528 | 0.119 | 0.190 |
| Water | 37.36 | 35.40 | 36.71 |
| Solids by drying | 62.64 | 64.60 | 63.29 |

From the above results, it will be seen that a substantial conversion of the sucrose into invert sugar was obtained. At a yield of 2 pounds of sugar solids per pound of bentonite, the invert sugar amounted to about 26% on the dry basis, while at a yield of 10 pounds per pound, the invert sugar amounted to about 14% on the dry basis. Additionally, a substantial reduction in both color and ash-forming constituents was effected. When the above procedure was repeated using a considerably lower space velocity or percolation rate, the conversion to invert sugar reached 41.5%. Repercolation of this solution through fresh bentonite yielded a product containing 79.4% of invert sugar, the pH of the filtrate being 2.7.

2. Finely divided bentonite, both dried and calcined, was contacted with a clarified sucrose solution (washed liquor) of 67° Brix at a temperature of 190° F., using 10% by weight of bentonite based on the solution, or a yield of 6.7 pounds of sugar solids per pound of bentonite. The dried bentonite had a volatile matter content of 15.8% and a volume weight of 61.6 pounds per cubic foot. The calcined bentonite was prepared by heating the dried bentonite at 750° F. for ½ hour to a volatile matter content of 5% by weight. The volume weight of the calcined material was 57.4 pounds per cubic foot. After intimately contacting the sugar solution with the bentonite, the latter was removed by filtration. The results obtained are given in the following table.

| Properties | Washed Liquor Charged | Solution from dried bentonite (20 minute contact) | Solution from calcined bentonite (5 minute contact) |
| --- | --- | --- | --- |
| Polarization | 66.90 | 7.00 | 38.10 |
| pH | 7.1 | 4.6 | 4.9 |
| Invert sugar | 0.02 | 89.55 | 43.20 |

As will be seen from the above data, a highly efficient conversion of sucrose into invert sugar may be accomplished by contacting the sucrose solution with finely divided bentonite. The time of contact may vary considerably, depending upon the quantity of bentonite used and the temperature of contacting. In most cases, however, the contact time for satisfactory conversion is usually less than about one hour.

I claim:

1. The method of producing invert sugar from a clarified sucrose solution, which comprises bringing said solution into intimate contact with bentonite at a temperature between 150° F. and 200° F., the weight ratio of sugar solids to bentonite being not greater than 15 to 1.

2. The method of producing invert sugar from a clarified sucrose solution, which comprises bringing said solution into intimate contact with bentonite at a temperature between 150° F. and 200° F., the weight ratio of sugar solids to bentonite being not greater than 15 to 1, and separating the treated solution from the bentonite.

3. The method of producing invert sugar from a clarified sucrose solution, which comprises bringing said solution into intimate contact with bentonite at a temperature between 160° F. and 170° F., the weight ratio of sugar solids to bentonite being between 2 and 10 to 1.

4. The method of producing invert sugar from a clarified sucrose solution, which comprises intimately contacting said solution with finely divided bentonite at a temperature between 150° F. and 200° F., the weight ratio of sugar solids to bentonite being not greater than 15 to 1.

5. The method of producing invert sugar from a clarified sucrose solution, which comprises intimately contacting said solution with finely divided bentonite at a temperature between 150° F. and 200° F., the weight ratio of sugar solids to bentonite being not greater than 15 to 1, and separating the treated solution from the bentonite.

6. The method of producing invert sugar from a clarified sucrose solution, at a temperature between 150° F. and 200° F., which comprises percolating said solution through granular bentonite which has been calcined at a temperature between 700° F. and 1200° F., the weight ratio of sugar solids to bentonite being not greater than 15 to 1.

7. The method of producing invert sugar from a clarified sucrose solution, which comprises percolating said solution through granular bentonite which has been calcined at a temperature between 700° F. and 1200° F., the weight ratio of sugar solids to bentonite being not greater than 15 to 1, and the percolation temperature being between 150° F. and 200° F.

8. The method of producing invert sugar from a clarified sucrose solution, at a temperature between 150° F. and 200° F., which comprises percolating said solution through granular bentonite which has been calcined at about 900° F., the weight ratio of sugar solids to bentonite being between 2 and 10 to 1.

9. The method of producing invert sugar from a clarified sucrose solution, which comprises percolating said solution through granular bentonite which has been calcined at about 900° F., the weight ratio of sugar solids to bentonite being between 2 and 10 to 1, and the percolation temperature being between 160° F. and 170° F.

WILLIAM A. LA LANDE, Jr.

REFERENCES CITED

The following references are of record in the file of this patent:

UNITED STATES PATENTS

| Number | Name | Date |
| --- | --- | --- |
| 1,946,124 | Belden | Feb. 6, 1934 |
| 2,261,917 | Pittman et al. | Nov. 4, 1941 |
| 2,261,919 | Pittman | Nov. 4, 1941 |
| 2,326,369 | La Lande | Aug. 10, 1943 |

OTHER REFERENCES

Englis et al.—"Production of a Palatable Artichoke Sirup," Industrial and Eng. Chem. vol. 34, No. 7, July 1942, pages 864–867, page 864 pertinent.